United States Patent [19]

Hong et al.

[11] Patent Number: 5,797,277
[45] Date of Patent: Aug. 25, 1998

[54] CONDENSATE COOLER FOR INCREASING REFRIGERANT DENSITY

[75] Inventors: Kwangtaek Hong, Riverview; Albert A. Patrosso, Grosse Pointe Woods, both of Mich.

[73] Assignee: Chrysler Corporation, Auburn Hills, Mich.

[21] Appl. No.: 965,137

[22] Filed: Nov. 6, 1997

[51] Int. Cl.$^6$ ............................................. F25D 21/14
[52] U.S. Cl. ............................ 62/285; 62/288; 62/513
[58] Field of Search ............................ 62/79, 279, 285, 62/288, 289, 272, 506, 513

[56] References Cited

U.S. PATENT DOCUMENTS

| | | | |
|---|---|---|---|
| 2,632,303 | 3/1953 | Smith | 62/285 |
| 3,812,687 | 5/1974 | Stolz | 62/323 |
| 4,023,380 | 5/1977 | Drouin | 62/279 |
| 4,280,334 | 7/1981 | Lakdawala | 62/277 |
| 4,490,991 | 1/1985 | Griffin | 62/279 |
| 4,615,181 | 10/1986 | Greenwood | 62/279 |
| 4,938,035 | 7/1990 | Dinh | 62/279 |
| 5,113,668 | 5/1992 | Wachs, III et al. | 62/506 |
| 5,327,743 | 7/1994 | Coltrin | 62/279 |
| 5,638,695 | 6/1997 | Kamio et al. | 62/279 |

Primary Examiner—John M. Sollecito
Attorney, Agent, or Firm—Lawrence J. Shurupoff

[57] ABSTRACT

A refrigerant system adapted for use with a vehicular air conditioner includes a supplemental heat exchanger for cooling refrigerant gas flowing into a compressor and for cooling refrigerant liquid flowing into an expansion valve. Water condensate from an evaporator is used for cooling the gas refrigerant flowing through the heat exchanger.

10 Claims, 1 Drawing Sheet

CONDENSATE COOLER FOR INCREASING REFRIGERANT DENSITY

BACKGROUND OF THE INVENTION

The present invention relates to a refrigeration system and more particularly to an automotive air conditioning system using water condensate to improve refrigeration efficiency and capacity.

DESCRIPTION OF THE PRIOR ART

It is known that refrigeration capacity and coefficient of performance can be improved by installing a liquid cooler between a dry receiver and a thermal expansion valve (TXV) in a typical refrigeration system. This approach has not been widely adopted because the refrigerant is heated as it cools the liquid line thereby lowering the density of the refrigerant.

The lower density of the refrigerant reduces the pumping efficiency of the compressor causing a reduction in output flow from the compressor pump. This causes the performance of the liquid cooler to be less than expected. Accordingly, a need exists for a liquid cooler which overcomes this drawback by preventing or reducing the drop in density of refrigerant entering the compressor pump after cooling the liquid line to the TXV.

SUMMARY OF THE INVENTION

The present invention has been developed to meet the needs noted above by providing a liquid line cooler in a refrigeration system in such a manner that the change in density of refrigerant flowing through the suction line of a compressor is minimized after cooling the liquid line to the TXV. This is achieved by cooling the refrigerant with cool water condensate flowing around and outside the suction line.

Water condensate from the system evaporator is generally in the temperature range of about 40° to 55° F. This water is arranged to flow by gravity over the exterior of the suction line preferably in a counter flow relation in order to cool the superheated vapor before it enters the compressor. In this manner, the liquid line cooler increases the refrigeration effect of the system by minimizing the drop in refrigerant density as the refrigerant in the suction line passes through the cooler. A particular advantage of the invention is that its effectiveness is increased when the condenser is highly loaded such as when a vehicle is idling, running at park, or in city traffic.

DETAILED DESCRIPTION OF THE PREFERRED EMBODIMENTS

Figure 1:
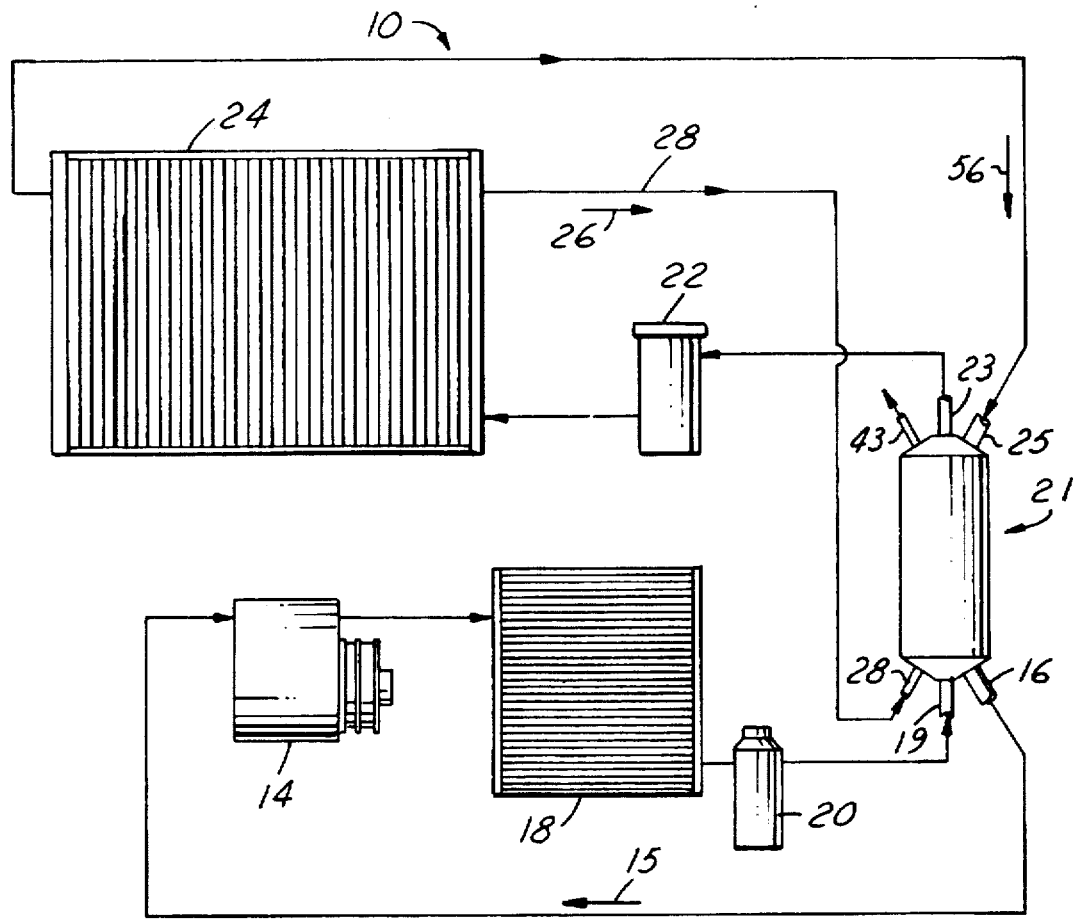
FIG. 1 is a schematic view of a refrigeration system constructed in accordance with the invention.

The present invention will now be described in conjunction with the drawings, beginning with FIG. 1 which depicts a conventional refrigeration system 10 provided with a heat exchanger or cooler 21 in accordance with the invention. System 10 includes a compressor 14 for receiving and compressing heat-laden refrigerant vapor depicted by the directional flow arrows 15.

Refrigerant enters the compressor inlet via suction line 16, is compressed and is pumped from the compressor outlet to the inlet of a condenser 18. As the refrigerant flows through the condenser, it gives up its heat to the cooler outside ambient air and condenses into a hot liquid.

A receiver dryer 20 is connected to the outlet of the condenser for removing moisture from the refrigerant and temporarily storing refrigerant if a full supply isn't needed by the system. Refrigerant continues flowing through the system from the condenser (or dry receiver if present), and flows through hot liquid line 19 to a heat exchanger or cooler 21 where the refrigerant is cooled. Cooler 21 will be described in more detail below.

After the liquid refrigerant is cooled by cooler 21 it exits the cooler through flow line 23 and enters the inlet of a thermal expansion valve or TXV 22 which meters the flow of refrigerant through the TXV outlet and into the inlet of an evaporator 24. The TXV compares the temperature and pressure of the refrigerant at the outlet of the evaporator and meters just enough refrigerant to maintain a preset superheat in the refrigerant exiting the evaporator.

Liquid refrigerant is vaporized as it flows through the evaporator and absorbs heat from air passing through its coils and fins. The cooled air is used for air conditioning such as cooling the interior of a vehicle cabin. Moisture from the cooler air is collected as cool liquid water condensate 26 and directed to cooler 21 via drain line 28.

The vaporized refrigerant exiting the outlet of the evaporator is directed to the heat exchanger or cooler 21 via flow line 25 where the refrigerant is cooled and its density is thereby increased. The cooler, denser, vaporized, gaseous refrigerant exits cooler 21 and enters the suction line 16 of compressor 14 where the cycle repeats itself.

Figure 2:
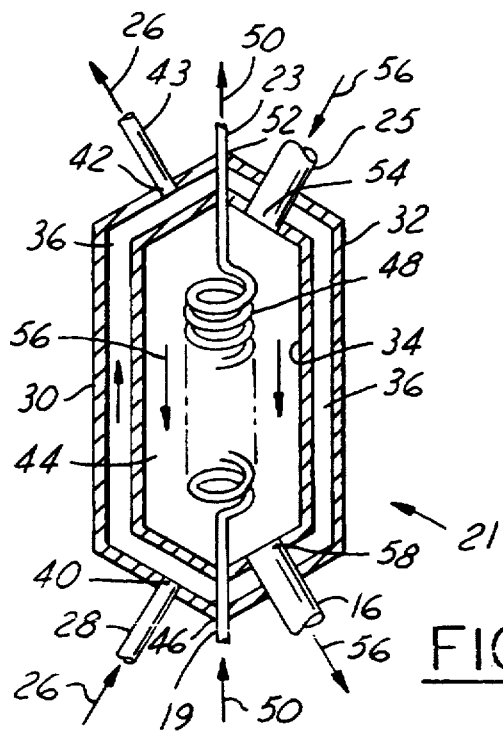
FIG. 2 is a schematic sectional view of a heat exchanging cooler constructed in accordance with the invention.

As seen in FIG. 2, the heat exchanger or cooler 21 may be constructed as a double walled shroud 30 having an outer wall 32 and an inner wall 34 which between them define a flow path 36. Water condensate 26 at a temperature of about 40° to 55° F. is fed by gravity from the drain line 28 of evaporator 24, and enters flow path 36 through cooling water inlet 40 formed in the outer wall 32 of shroud 30. Cooling water 26 flows by gravity around and through shroud 30 via flow path 36 and exits the outer wall 32 via cooling water outlet 42. The spent, warmed condensate may then be drained away in conventional fashion through drain 43.

The inner wall 34 of shroud 30 defines an interior chamber 44 which is surrounded and encapsulated by cooling water condensate 26. Chamber 44 is formed with a superheated gaseous refrigerant inlet 46 through which hot liquid line 19 from the condenser 18 (or receiver dryer 20) passes into chamber 44. Inlet 46 passes through both the inner and outer walls of shroud 30.

A coil 48 may be provided in line 19 to enhance heat transfer and cooling of the hot liquid refrigerant 50 flowing through coil 48. A hot liquid refrigerant outlet 52 is formed through the inner and outer walls of shroud 30 to allow flow line 23 to exit coil 48 and continue on to the TXV 22.

Shroud 30 further includes a cold refrigerant gas inlet 54 formed through its inner and outer walls 32, 34 for allowing cold refrigerant gas 56 to flow into and fill chamber 44. The cold refrigerant gas 56 flows along and against the inner wall 34 of chamber 44 and is cooled by the water condensate 26 flowing through flow path 36 in conterflow relation with gas 56.

A cold gas refrigerant outlet 58 is also formed through the inner and outer walls of shroud 30 for allowing the cold gas 56 to enter suction line 16 of compressor 14. The cold gas 56 is also directed in counterflow relation to the hot liquid refrigerant 50 flowing through coil 48. In this manner, the cold refrigerant gas 56 cools the hot liquid refrigerant 50 and improves the cooling capacity of the system 10.

At the same time, the cold gas 56 is cooled by the cold water condensate 26 and is thereby increased in density prior to entering the compressor 14. This increase in density increases the efficiency of the compressor. Thus, rather than discarding the cold water condensate 26 as in prior refrigeration systems, the present invention uses this condensate to cool the cold refrigerant gas 56 and remove more energy from the cold refrigerant gas 56 than the cold refrigerant 56 removes from the hot refrigerant liquid 50.

Figure 3:
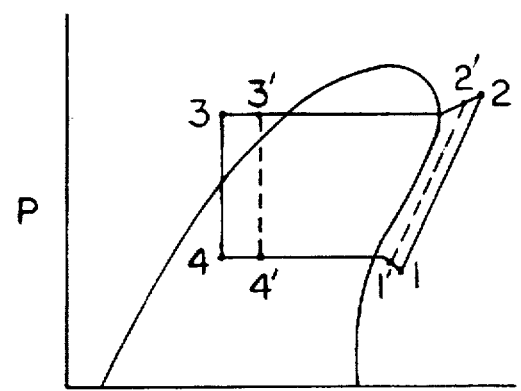
FIG. 3 is a pressure-enthalpy plot of a typical refrigeration cycle provided with a liquid line cooler according to the invention and depicting in dashed lines the same cycle without the cooler.

A comparison of this system with the same system without cooler 21 is graphed in FIG. 3 wherein a pressure-enthalpy plot of the present invention is depicted along plot lines 1–2–3–4 and the prior art along lines 1'–2'–3'–4'. Line 1–2 represents the compression stage, line 2–3 the condenser stage, line 3–4 the TXV expansion stage and lines 4–1 the evaporation stage.

The effects of the invention are best seen in FIG. 3 by the difference between points 3'—3. In practice, this difference can amount to a 5° F. lowering of the air temperature exiting through the evaporator 24.

It should be understood that while this invention has been discussed in connection with one particular example, those skilled in the art will appreciate that other modifications can be made without departing from the spirit of this invention after studying the specification, drawings, and the following claims.

We claim:

1. A refrigeration system, comprising:
    a compressor for compressing a refrigerant, said compressor having an inlet and an outlet;
    a condenser having an inlet receiving said refrigerant compressed by said compressor and having an outlet;
    an expansion valve receiving said refrigerant from said condenser outlet and metering said refrigerant to a valve outlet;
    an evaporator having an inlet receiving said refrigerant from said expansion valve outlet and an outlet passing said refrigerant to said compressor;
    a drain line receiving condensed water from said evaporator;
    a heat exchanger receiving said condensed water from said drain line and arranged in heat exchanging relation to said refrigerant flowing between said evaporator and said compressor for cooling said refrigerant entering said compressor.

2. The system of claim 1, wherein said heat exchanger is further arranged in heat exchanging relation to said refrigerant flowing between said condenser and said expansion valve for cooling said refrigerant entering said expansion valve.

3. The system of claim 1, wherein said heat exchanger comprises a hollow shroud having inner and outer walls between which said condensed water flows, and a water inlet and a water outlet for passing said condensed water through said shroud.

4. The system of claim 3, wherein said heat exchanger comprises an internal chamber defined by said inner walls, said chamber having a hot liquid refrigerant inlet and a hot liquid refrigerant outlet for passing hot liquid refrigerant through said heat exchanger as said hot liquid refrigerant flows from said condenser to said expansion valve.

5. The system of claim 4, wherein said heat exchanger further comprises a cold gas inlet and a cold gas outlet, each in fluid communication with said chamber.

6. The system of claim 5, wherein said refrigerant flowing between said evaporator and said compressor comprises cold gas refrigerant flowing through said chamber via said cold gas inlet and said cold gas outlet.

7. The system of claim 6, wherein said cold gas refrigerant flows along said inner walls of said chamber and around said hot liquid refrigerant flowing through said chamber.

8. The system of claim 7, further comprising a cooling coil disposed within said chamber and in fluid communication with said hot liquid refrigerant.

9. The system of claim 8, wherein said hot liquid refrigerant flowing through said cooling coil and said cold gas refrigerant flowing through said chamber are arranged in counterflow relation.

10. The system of claim 1, wherein said condensed water flows through said heat exchanger by gravity.

* * * * *